(12) United States Patent
Sanchez et al.

(10) Patent No.: US 6,729,180 B2
(45) Date of Patent: May 4, 2004

(54) PACKAGING FOR RF SIGNAL SENSOR WITH BATTERY CHANGING CAPABILITIES AND METHOD OF USING

(75) Inventors: Ramon A Sanchez, Chihuahua (MX); Manuel S Sanchez, Chihuahua (MX); Robert A. Newman, El Paso, TX (US); Juan C Torres, Chihuahua (MX)

(73) Assignee: Delphi Technologies, Inc., Troy, MI (US)

( * ) Notice: Subject to any disclaimer, the term of this patent is extended or adjusted under 35 U.S.C. 154(b) by 16 days.

(21) Appl. No.: 10/254,242

(22) Filed: Sep. 25, 2002

(65) Prior Publication Data

US 2004/0055371 A1 Mar. 25, 2004

(51) Int. Cl.[7] ............................................. B60C 23/02
(52) U.S. Cl. ..................... 73/146.3; 73/146.8; 340/442; 340/447
(58) Field of Search ................................ 73/146, 146.2, 73/146.3, 146.5, 146.8; 340/442, 447

(56) References Cited

U.S. PATENT DOCUMENTS

| | | | | |
|---|---|---|---|---|
| 5,119,066 A | * | 6/1992 | Ballyns ....................... 340/442 |
| 5,285,189 A | | 2/1994 | Nowicki et al. ............. 340/447 |
| 5,731,754 A | | 3/1998 | Lee, Jr. et al. ............... 340/447 |
| 5,741,966 A | | 4/1998 | Handfield et al. ......... 73/146.5 |
| 5,764,138 A | | 6/1998 | Lowe .......................... 340/447 |
| 5,853,020 A | | 12/1998 | Widner ........................ 137/227 |
| 5,889,464 A | * | 3/1999 | Huang ......................... 340/442 |
| 5,900,808 A | | 5/1999 | Lebo ........................... 340/442 |
| 5,929,755 A | | 7/1999 | Hsieh .......................... 340/442 |
| 5,963,128 A | | 10/1999 | McClelland ................. 340/447 |
| 6,259,361 B1 | | 7/2001 | Robillard et al. ........... 340/447 |
| 6,534,711 B1 | * | 3/2003 | Pollack ....................... 174/52.2 |

* cited by examiner

Primary Examiner—Edward Lefkowitz
Assistant Examiner—Andre Allen
(74) Attorney, Agent, or Firm—Jimmy L. Funke

(57) ABSTRACT

A pressure transducer assembly mountable in an interior of a tire for sensing a pressure of a fluid in the tire comprising: a sensor housing having a first compartment in fluid communication with the fluid; a second compartment separated from the first compartment by a divider slideably engaged with and removable from the sensor housing; the divider having disposed thereon a circuitry; the circuitry including a pressure transducer in fluid communication with the first compartment, and a transmission circuit coupled to the pressure transducer for transmitting a signal responsive to the internal pressure to a remote location; a removable power source coupled to the circuitry contained entirely within the second compartment; and a cover sealingly engaged with the housing and the divider such that the second compartment is not in fluid communication with the first compartment. A method of sensing the tire pressure and communicating a signal responsive to the tire pressure to an external receiver located in a remote location is also disclosed.

16 Claims, 4 Drawing Sheets

PACKAGING FOR RF SIGNAL SENSOR WITH BATTERY CHANGING CAPABILITIES AND METHOD OF USING

BACKGROUND

Motor vehicles are supported by inflatable tires having a desired inflation pressure. Improper inflation of a tire can lead to poor gas mileage and increased tire wear. Maintaining tire inflation within an acceptable range can alleviate these issues. To do so however, requires frequent measuring of tire pressure and evaluation of whether that pressure lies within an acceptable range. Moreover, tire pressure will also vary according to temperature and vehicle load.

Systems that automatically monitor pressure and provide an indication to the vehicle operator when the fluid (typically air) within the pressure vessel (e.g., the tire) reaches a condition of improper inflation typically include a pressure sensor in communication with an external receiver capable of interfacing with the vehicle operator. These systems are typically a collection of remote electronic circuits for both sensing the tire pressure and communicating the pressure information to a separate receiver, which in-turn interfaces with the vehicle operator. The actual pressure sensor may be located external to the tire, for example on or in the valve stem of the wheel. The sensor may also be located directly within the mounted wheel/tire assembly. Because the sensors are located in remote areas of the vehicle, these systems are required to operate under their own power (e.g., battery power).

The communication link between the sensor and the external receiver may be wireless, with radio frequency signals and/or infrared or optical signals being the most common forms. However, the utility of wireless communication in these systems is severely limited due to reliance on battery power. Because batteries in these systems are not readily replaced, such systems can only consume an amount of power that allows the battery to last over the useful lifetime of the vehicle. Battery replacement is not available for a variety of reasons including the corrosive environment within an inflated tire.

The environment within an inflated tire is corrosive due to the moisture content and various other corrosive materials present in the tires themselves. Temperature extremes that range from sub-zero to several hundred degrees, along with the constant forces, vibrations and shocks routinely at work add to the inhospitable nature of this environment. To combat these forces acting upon in-wheel sensors, components are typically well secured and sealed to mitigate external effects, and to prevent damage to the apparatus. While this approach serves a protective function, it makes battery replacement difficult if not impossible without destroying the apparatus itself.

Thus, to provide the needed longevity, a relatively large battery must be used. This in turn results in a greater force acting on the battery due to the forces of the rotating tire, in combination with the increase in mass and expense of a larger battery. In addition, the unit must be replaced as a whole and so cannot be serviced piecemeal. Accordingly, a tire pressure sensing and transmitting assembly having a replaceable battery would be of great benefit.

SUMMARY OF THE INVENTION

Disclosed herein is a pressure transducer assembly mountable in an interior of a pressure vessel (e.g., a tire mounted on a wheel) for sensing a pressure of a fluid in the container comprising: a sensor housing having a first compartment in fluid communication with the fluid; a second compartment separated from the first compartment by a divider slideably engaged with and removable from the sensor housing; the divider having disposed thereon a circuitry; the circuitry including a pressure transducer in fluid communication with the first compartment, and a transmission circuit coupled to the pressure transducer for transmitting a signal responsive to the internal pressure, to a remote location; a removable power source coupled to the circuitry contained entirely within the second compartment; and a cover sealingly engaged with the housing and the divider such that the second compartment is not in fluid communication with the first compartment.

Also disclosed is a method of sensing a pressure of a fluid within a tire and communicating the pressure to an external receiver located in a remote location, comprising: disposing a pressure transducer assembly within the pressure vessel in communication with the fluid; sensing the pressure of the fluid; and transmitting a signal responsive to the pressure to the external receiver located in the remote location; the pressure transducer assembly comprising: a sensor housing having a first compartment in fluid communication with the fluid; a second compartment separated from the first compartment by a divider slideably engaged with and removable from the sensor housing; the divider having disposed thereon a circuitry; the circuitry including a pressure transducer in fluid communication with the first compartment, and a transmission circuit coupled to the pressure transducer for transmitting the signal responsive to the pressure to the external receiver located in the remote location; a removable power source coupled to the circuitry contained entirely within the second compartment; and a cover sealing engaged with the housing and the divider such that the second compartment is not in fluid communication with the first compartment.

The above described and other features are exemplified by the following figures and detailed description.

BRIEF DESCRIPTION OF THE DRAWINGS

Referring now to the figures wherein the like elements are numbered alike.

DETAILED DESCRIPTION

Figure 1:
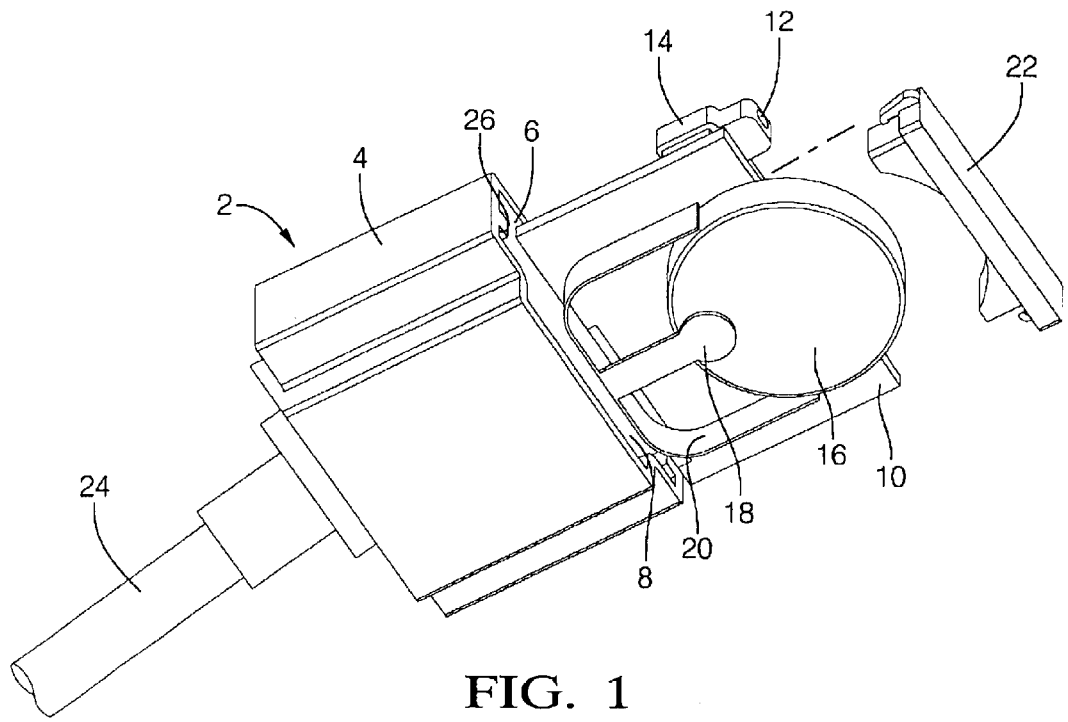
FIG. 1 is a bottom view of an expanded assembly described herein.
Figure 2:
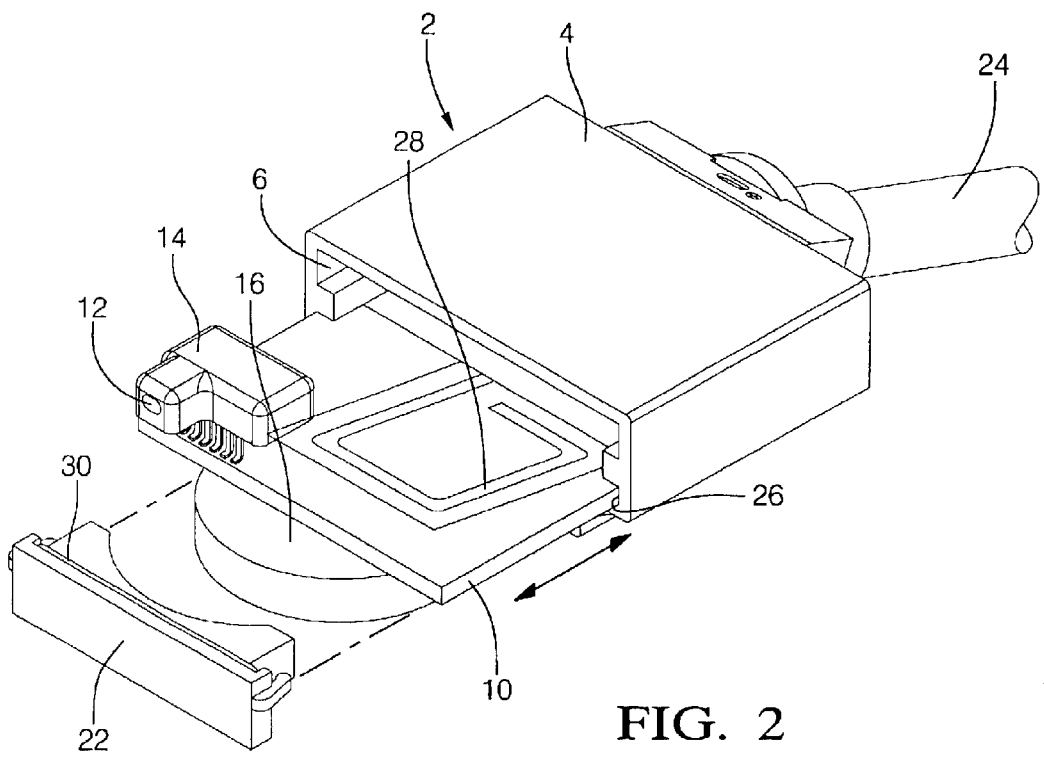
FIG. 2 is a top perspective view of an expanded assembly described herein.

The pressure sensing assembly described herein includes an assembly housing, an electronic circuitry including a pressure sensing transducer, and a means of communicating the pressure to an external receiver. Power for the circuitry is provided by a portable power source, such as a battery.

Turning now to the figures, and in particular to FIGS. 1, 2, 3, and 4, an embodiment of the pressure transducer assembly described herein is referred to generally as 2. The embodiment shown has a sensor housing 4 divided into a first compartment 6 and a second compartment 8. These compartments being separated from one another by a divider 10. Circuitry is disposed on or in contact with divider 10, and includes a pressure transducer 12 coupled to a transmission circuit 14. The transmission circuit shown includes an antenna 28, capable of transmitting a signal responsive to an input generated by an external pressure to a remote location (not shown). The replaceable power source 16 is in electrical communication with the circuitry through power supply contacts 18 and 20. A cover 22 sealably engages sensor housing 4 and divider 10 to seal second compartment 8 wherein power source 16 is located. The figures also depict a pressure transducer assembly 2 having a valve stem 24 attached to the sensor housing 4.

The sensor housing 4 is required to have a structural integrity capable of withstanding the forces acting upon it while in use. It must also be made from a material that is stable in the corrosive environment and at the temperatures found within an inflated tire during operation. Preferably, the sensor housing 4 is formed from a polymeric resin (e.g., plastic). Suitable polymeric resins include: thermosetting resins including, for example, alkyds, diallyl phthalates, epoxies, melamines, phenolics, polyesters, urethanes, rigid silicones, and the like; elastomeric resins including, for example, acrylates, butyls, chlorosulfonated polyethylene, fluorocarbons, fluorosilicones, polysulfides, polyurethanes, neoprenes, nitrites, silicones, styrene, butadienes, and the like; and thermoplastic resins including, for example, acetates, acrylics, cellulosics, chlorinated polyethers, fluorocarbons, nylons (polyamides), polycarbonates, polyethylenes, polypropylenes, polyimides, polyphenylene oxides, polystyrenes, polysulfones, vinyls, and the like. These may also include fillers, antioxidants, UV absorbers, stabilizers, and the like. The preferred material of construction is glass filled nylon-66.

The sensor housing 4 is preferably formed through a process suitable for forming a housing capable of withstanding the conditions discussed above including injection molding, casting, sintering, and the like. Preferably, the sensor housing 4 is formed from injection molding.

To provide support, contact, and protection of the various components, the sensor housing 4 is divided into separate compartments by divider 10. Preferably, divider 10 is removable from the housing to allow for access of the various circuitries and replacement of power supply 16. A notch, slot and/or groove 26 is arranged, aligned, and dimensioned in the housing to allow divider 10 to slideably engage housing 4, so forming the separate compartments.

It is important that the pressure transducer 12 be in fluid communication with the pressurized fluid in the pressure container (e.g., compressed air in the tire/wheel assembly). Preferably, first compartment 6 serves as a conduit to place the pressure transducer in fluid communication with the pressurized fluid to be measured, and also to protect the circuitry from harmful contact with foreign matter. Accordingly, first compartment 6 is open to the environment on at least one side.

Second compartment 8 is located between, and bounded by sensor housing 4 and divider 10, and is arranged and dimensioned to contain the removable power source 16. Preferably, second compartment 8 is dimensioned to not only contain but also to provide support of power source 16 and thus hold it in place to remain in contact with the electronic circuitry during operation.

Figure 3:
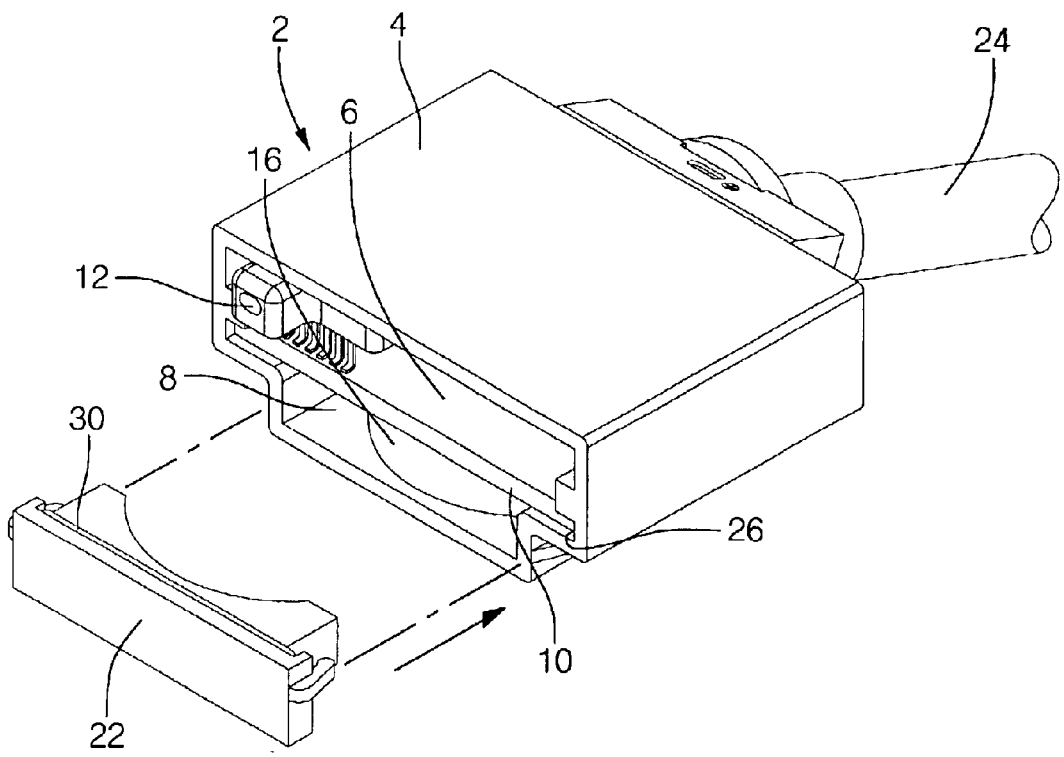
FIG. 3 is a perspective view showing an assembly described herein and the placement of a cover.
Figure 4:
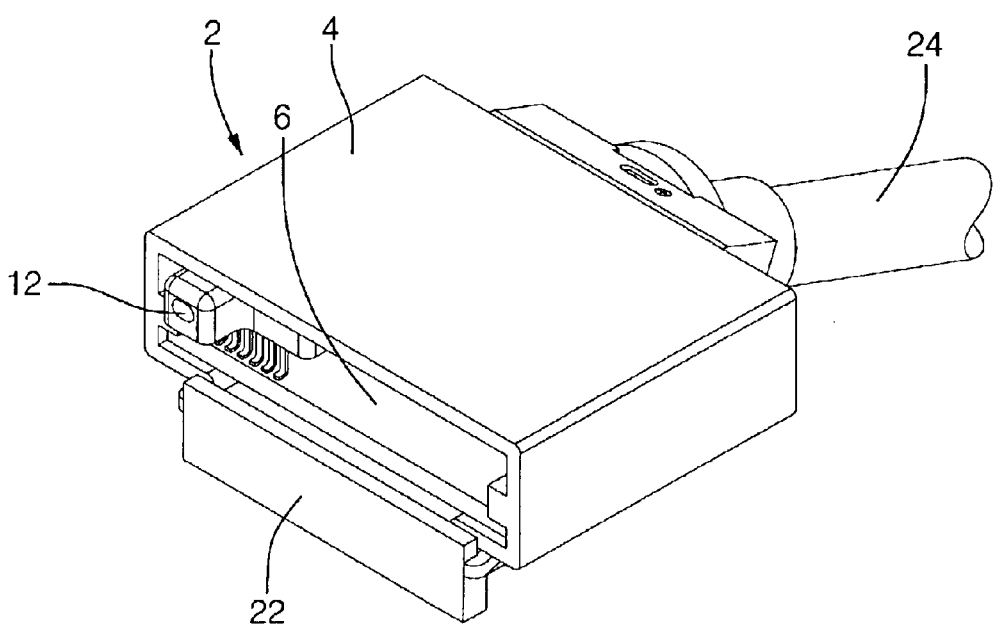
FIG. 4 is a perspective view of the completed assembly described herein.

Cover 22 completes the enclosure of power source 16 and any circuitry disposed within second compartment 8 (see FIGS. 3 and 4). Preferably it frictionally engages sensor housing 4 and/or divider 10 to form a closed compartment. Also preferably, cover 22 is equipped with a cover sealing member 30 which forms and essentially airtight seal within second compartment 8. Sealing of the second compartment 8 is important to protect the power source 8 and associated circuitry from corrosive materials present within the pressure container environment. Specifically, protection is sought from moisture present and other various residual materials commonly found within such pressure containers.

Divider 10 is also fitted within the sensor housing 4 such that the second compartment 8 is protected from the corrosive materials present. Preferably the divider forms an airtight seal with sensor housing 4. The divider 10 also provides support for the circuitry. The circuitry is preferably directly attached to the divider and/or the divider is in direct physical contact with a substrate to which the circuitry is attached.

Figure 8:
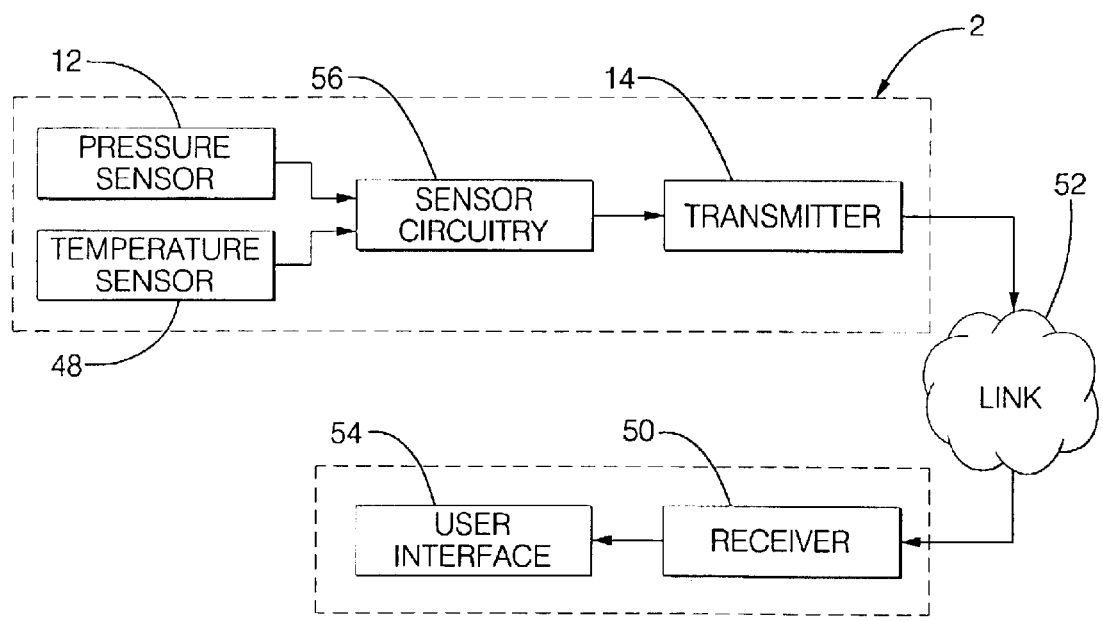
FIG. 8 shows a block diagram of a tire pressure monitoring system described herein.

The pressure transducer 12, any sensor circuitry 56 and transmission circuitry 14 is preferably comprised of solid-state integrated circuits in electrical connection with power source 16. Also, other types of sensors and associated circuitry may be present including, for example, a temperature sensor 48 and associated circuitry 56 (See FIG. 8). The transmission circuitry 14 is also preferably in communication with an antenna 28 to facilitate communication over a wireless signal link 52 of a signal indicative of the tire internal pressure to an outside receiver 50, which is located remote to the sensor (See FIG. 8). Preferably, the mode of communication is a digital representation (data) of the pressure over the wireless transmission link (e.g., radio frequency (RF), magnetic, ultrasonic, and/or the like). The receiver 50 then processes the pressure data and any other sensor data to interact with the operator of the vehicle at the user interface 54. The user interface 54 then apprises the operator of the vehicle of the inflation status of the tire.

The embodiment shown in the figures also includes a valve stem assembly 24 joined to the pressure sensor assembly 2. The valve stem is hollow, forming a conduit there through. A sealing member is disposed within this conduit that is selectively movable between a closed position in which the sealing member prevents fluid flow within the conduit; and an open position in which the sealing member allows fluid to flow through the conduit. Importantly, the valve stem 24, when present, serves as an attaching means to the wheel as shown in FIGS. 5 and 6.

Figure 5:
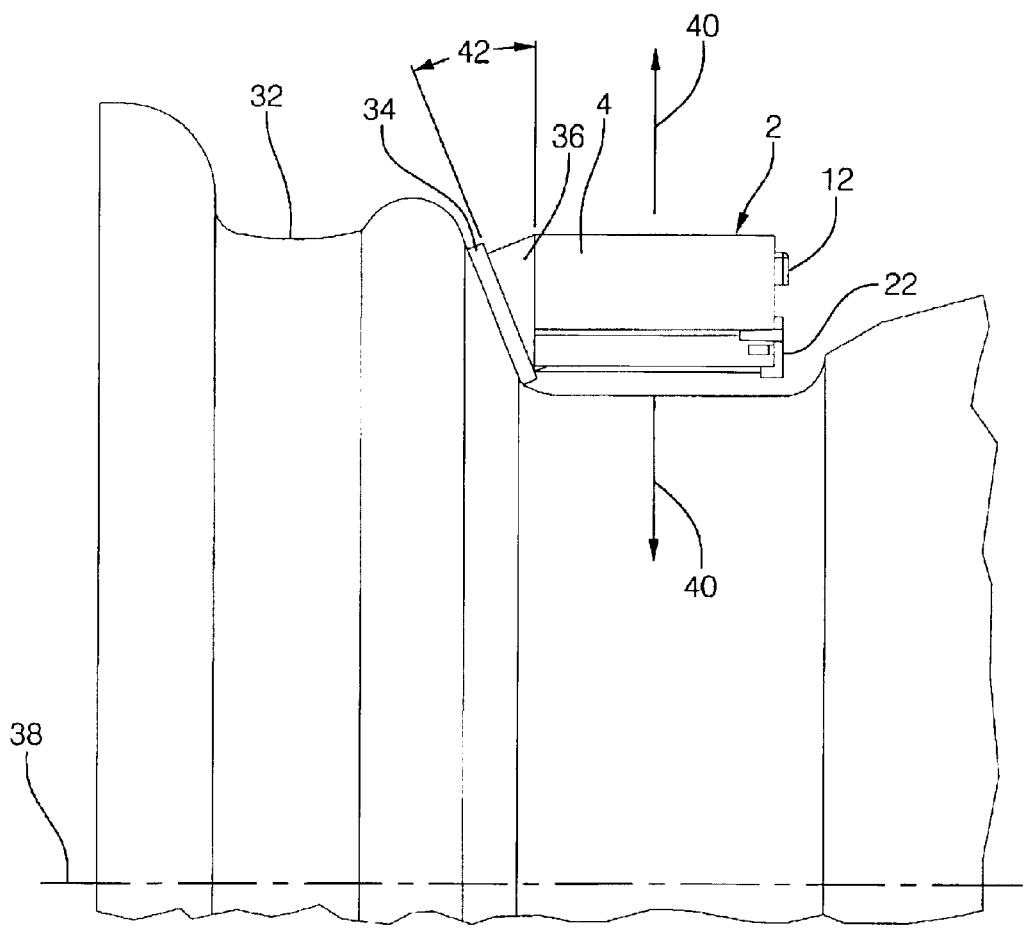
FIG. 5 is a side view of an assembly described herein mounted on a wheel.
Figure 6:
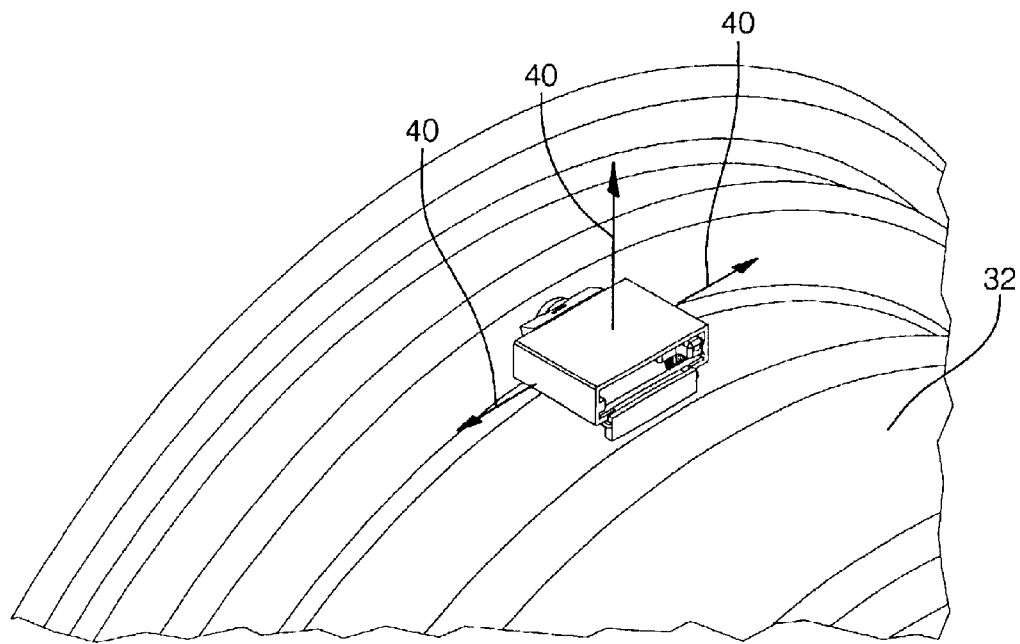
FIG. 6 is a top view of an assembly described herein mounted on a wheel.

FIG. 5 shows pressure transducer assembly 2 assembled on a wheel 32. The valve stem 24 protrudes through a hole located within the wheel and is preferably secured using a threaded member (not shown) such that the pressure transducer assembly 2 may be secured to, and remain in sealing contact with wheel 32 using a compression washer 34 between wheel 32 and sensor housing 4. Also shown is the orientation of the pressure transducer assembly 2 to the rotational axis 38 of wheel 32. Preferably, the sensor housing 4 has a mating surface disposed at an angle 42 complementary to the mounting angle of the wheel 32, such that a major axis of the pressure transducer assembly 2 is essentially parallel to rotational axis 38. More importantly, a major axis of the power source is parallel to this rotational axis 38 of wheel 32. This orientation prevents the forces experienced by the power source during operation (shown graphically as force lines 40) from separating the various components operably connected within the power source (e.g., the electrodes and electrolyte of the battery). In doing so, this orientation prolongs the life of the power source. The value of the angle is determined by the location of the assembly on the wheel, and is readily determined by one skilled in the art. In addition, the proper angle may be accomplished by placing an angled shim or spacer between and in contact with the wheel and assembly 2 to properly position assembly 2 within the pressure container.

Figure 7:
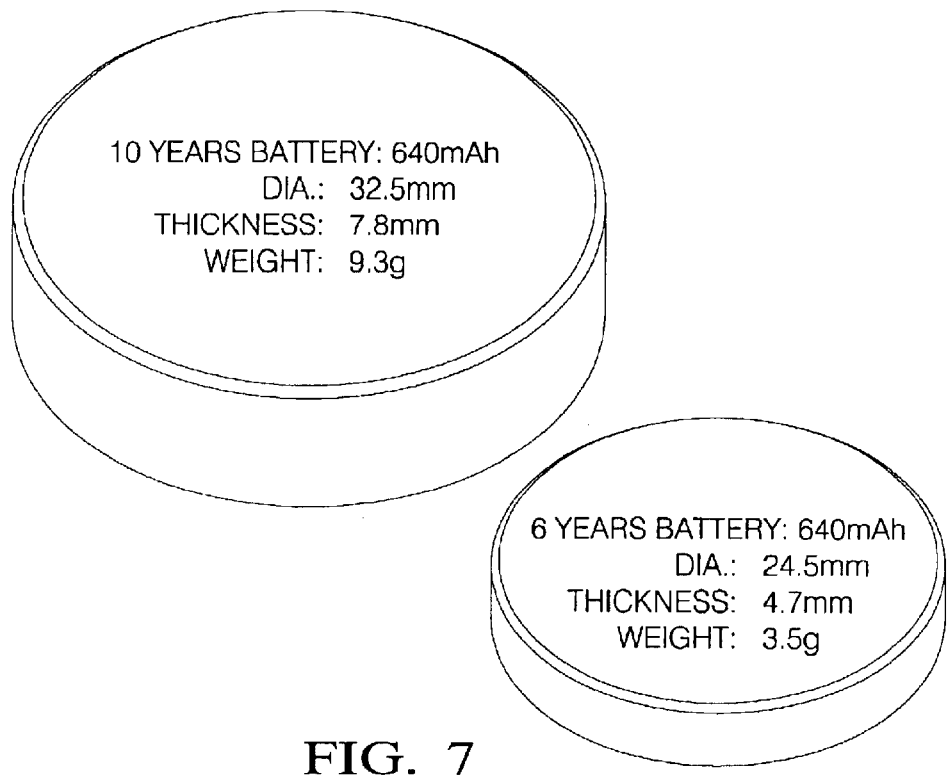
FIG. 7 shows the relative proportions of a comparative battery to a replaceable battery for use herein.

The assembly having a replaceable power source described herein thus allows for use of a smaller power source (e.g., battery) than would otherwise be required if the power source where not replaceable over the useful lifetime of the assembly. For example, the two batteries shown in FIG. 7 represent a comparative non-replaceable battery 44 and a replaceable battery 46 used herein. The relative dimensions mass and useful life are listed in Table 1 below:

TABLE 1

|  | Comparative Battery 44 | Battery 46 |
|---|---|---|
| Lifetime | 10 years | 6 years |
| Power | 980 milliamp hours | 640 milliamp hours |
| Diameter | 32.5 millimeters | 24.5 millimeters |
| Thickness | 7.8 millimeters | 4.7 millimeters |
| Mass | 9.3 grams | 3.5 grams |

In addition to being almost twice as large and nearly three times the mass, the comparative battery 44 is also more than ten times the expense of replaceable battery 46. Not only does the replaceable battery 46 require less counterbalancing mass when installed on a rotating wheel, the removable battery also allows the pressure transducer assembly to be serviced instead of being removed and replaced.

While the invention has been described with reference to an exemplary embodiment, it will be understood that by those skilled in the art the various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A pressure transducer assembly mountable in an interior of a tire for sensing a pressure of a fluid in said tire comprising:
   a sensor housing having a first compartment in fluid communication with said fluid;
   a second compartment separated from said first compartment by a divider slideably engaged with and removable from said sensor housing;
   said divider having disposed thereon a circuitry;
   said circuitry including a pressure transducer in fluid communication with said first compartment, and a transmission circuit coupled to said pressure transducer for transmitting a signal responsive to said pressure to a remote location;
   a removable power source coupled to said circuitry contained entirely within said second compartment; and
   a cover sealing engaged with said housing and said divider such that said second compartment is not in fluid communication with said first compartment.

2. The assembly of claim 1, wherein a wheel valve stem having a conduit therethrough is attached to said sensor housing;
   said wheel valve stem having a sealing member disposed within said conduit;
   said sealing member being selectively movable between a closed position in which said sealing member prevents a fluid flow within said conduit; and
   an open position in which said sealing member allows said fluid flow through said conduit.

3. The assembly of claim 2, wherein said valve stem is disposed at an angle such that a major axis of said removable power source is essentially parallel to a rotational axis of a tire wherein said assembly is disposed.

4. The assembly of claim 1, wherein said removable power source is a battery.

5. The assembly of claim 1, wherein said sensor housing is formed thorough injection molding.

6. The assembly of claim 1, wherein said divider is slideably engaged within a grove disposed within said sensor housing.

7. The assembly of claim 1, wherein said transmission circuit includes an antenna in an essentially spiral orientation disposed on said divider.

8. The assembly of claim 1, wherein said transmitting of said signal responsive to said pressure to a remote location is via RF, optical, infrared or a combination comprising at least one of the foregoing.

9. A method of sensing a pressure of a fluid within a tire and communicating said pressure to an external receiver located in a remote location, comprising:
   disposing a pressure transducer assembly within said tire in communication with said fluid;
   sensing said pressure of said fluid; and
   transmitting a signal responsive to said pressure to said external receiver located in said remote location;
   said pressure transducer assembly comprising:
      a sensor housing having a first compartment in fluid communication with said fluid;
      a second compartment separated from said first compartment by a divider slideably engaged with and removable from said sensor housing;
      said divider having disposed thereon a circuitry;
      said circuitry including a pressure transducer in fluid communication with said first compartment, and a transmission circuit coupled to said pressure transducer for transmitting said signal responsive to said pressure to said external receiver located in said remote location;
      a removable power source coupled to said circuitry contained entirely within said second compartment; and
      a cover sealing engaged with said housing and said divider such that said second compartment is not in fluid communication with said first compartment.

10. The method of claim 9, wherein a wheel valve stem having a conduit therethrough is attached to said sensor housing;
   said wheel valve stem having a sealing member disposed within said conduit;

said sealing member being selectively movable between a closed position in which said sealing member prevents a fluid flow within said conduit; and an open position in which said sealing member allows said fluid flow through said conduit.

11. The method of claim 10, wherein said wheel valve stem is disposed at an angle such that a major axis of said removable power source is essentially parallel to a rotational axis of said tire wherein said assembly is disposed.

12. The method of claim 9, wherein said removable power source is a battery.

13. The method of claim 9, wherein said sensor housing is formed thorough low pressure injection molding.

14. The method of claim 9, wherein said divider is slideably engaged within a grove disposed within said sensor housing.

15. The method of claim 9, wherein said transmission circuit includes an antenna in an essentially spiral orientation disposed on said divider.

16. The method of claim 9, wherein said transmitting of said signal responsive to said pressure to a remote location is via RF, magnetic, ultrasonic, or a combination comprising at least one of the foregoing.

* * * * *